United States Patent
Hood et al.

(10) Patent No.: US 7,752,488 B2
(45) Date of Patent: Jul. 6, 2010

(54) METHOD TO ADJUST ERROR THRESHOLDS IN A DATA STORAGE AND RETRIEVAL SYSTEM

(75) Inventors: James Lamar Hood, Tucson, AZ (US); Brian Anthony Rinaldi, Tucson, AZ (US); Micah Robison, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 11/326,652

(22) Filed: Jan. 6, 2006

(65) Prior Publication Data

US 2007/0174665 A1 Jul. 26, 2007

(51) Int. Cl.
*G06F 11/00* (2006.01)
(52) U.S. Cl. .................. 714/5; 714/42; 714/4; 714/6
(58) Field of Classification Search .............. 714/4, 714/6, 5
See application file for complete search history.

(56) References Cited

U.S. PATENT DOCUMENTS

| | | | |
|---|---|---|---|
| 5,577,196 A * | 11/1996 | Peer | 714/4 |
| 5,864,558 A | 1/1999 | Johnson | |
| 5,952,563 A | 9/1999 | Shiraki | |
| 6,052,415 A | 4/2000 | Carr et al. | |
| 6,442,711 B1 * | 8/2002 | Sasamoto et al. | 714/38 |
| 6,453,434 B2 | 9/2002 | Delp et al. | |
| 6,542,950 B1 | 4/2003 | Bodnar | |
| 6,844,704 B2 | 1/2005 | Wilk et al. | |
| 6,975,590 B2 * | 12/2005 | Killen et al. | 370/225 |
| 7,133,966 B2 * | 11/2006 | Sato et al. | 711/114 |
| 7,436,418 B2 * | 10/2008 | Koyabu et al. | 347/171 |
| 2003/0079160 A1 * | 4/2003 | McGee et al. | 714/39 |
| 2003/0084200 A1 * | 5/2003 | Buehler et al. | 709/318 |
| 2004/0024962 A1 * | 2/2004 | Chatterjee et al. | 711/114 |
| 2004/0264498 A1 * | 12/2004 | Feuerstraeter et al. | 370/465 |
| 2005/0022064 A1 * | 1/2005 | Steinmetz et al. | 714/42 |
| 2005/0120259 A1 * | 6/2005 | Aoki | 714/5 |
| 2005/0138489 A1 * | 6/2005 | Benhase et al. | 714/56 |
| 2005/0246568 A1 * | 11/2005 | Davies | 714/2 |
| 2005/0262386 A1 * | 11/2005 | Numanoi | 714/5 |
| 2005/0268034 A1 * | 12/2005 | Yagisawa et al. | 711/114 |
| 2005/0278570 A1 * | 12/2005 | Jastad et al. | 714/25 |

(Continued)

FOREIGN PATENT DOCUMENTS

CN 1707438 12/2005

(Continued)

*Primary Examiner*—Scott T Baderman
*Assistant Examiner*—Chae Ko
(74) *Attorney, Agent, or Firm*—Dale F. Regelman; Quarles & Brady LLP

(57) ABSTRACT

A method is disclosed to adjust error thresholds in a data storage and retrieval system. The method supplies a data storage and retrieval system comprising memory and microcode, wherein that microcode comprises one or more default error thresholds. The method determines if the memory comprises one or more operational error thresholds. If the method determines that the memory comprises one or more operational error thresholds, then the method operates the data storage and retrieval system using those one or more operational error thresholds. Alternatively, if the method determines that the memory does not comprise one or more operational error thresholds, then the method sets the one or more default error thresholds as the one or more operational error thresholds.

18 Claims, 4 Drawing Sheets

U.S. PATENT DOCUMENTS

| | | | |
|---|---|---|---|
| 2006/0047900 A1* | 3/2006 | Tanaka et al. | 711/113 |
| 2006/0123285 A1* | 6/2006 | De Araujo et al. | 714/721 |
| 2006/0136771 A1* | 6/2006 | Watanabe | 714/1 |
| 2006/0143422 A1* | 6/2006 | Mashima et al. | 711/170 |
| 2006/0230306 A1* | 10/2006 | Richards et al. | 714/7 |
| 2007/0011360 A1* | 1/2007 | Chang et al. | 710/5 |
| 2007/0118676 A1* | 5/2007 | Kano et al. | 710/315 |
| 2007/0139809 A1* | 6/2007 | Liikanen et al. | 360/75 |

FOREIGN PATENT DOCUMENTS

| | | |
|---|---|---|
| EP | 0230691 A1 | 10/1988 |
| FR | 2548425 A1 | 1/1985 |

\* cited by examiner

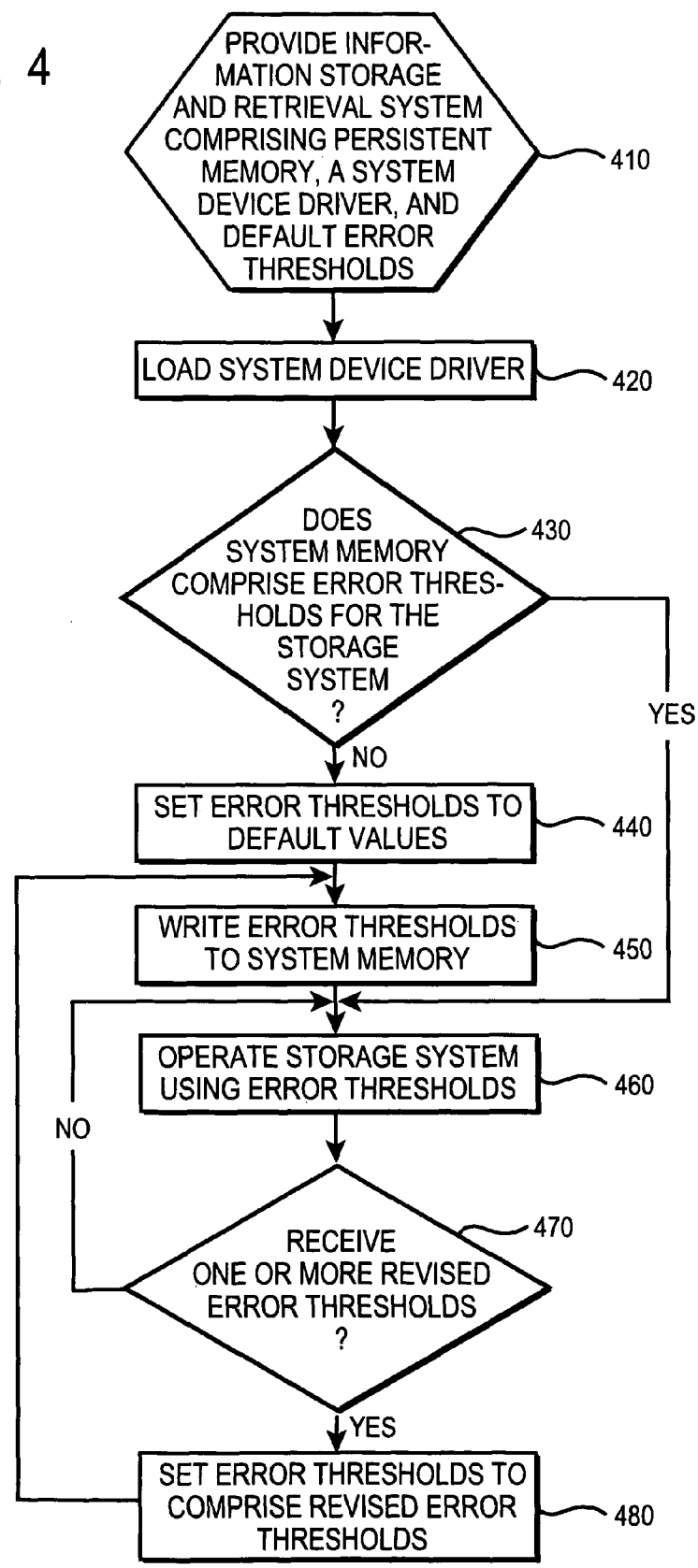

METHOD TO ADJUST ERROR THRESHOLDS IN A DATA STORAGE AND RETRIEVAL SYSTEM

FIELD OF THE INVENTION

This invention relates to a method to adjust error thresholds in a data storage and retrieval system.

BACKGROUND OF THE INVENTION

Data storage and retrieval systems are used to store information provided by one or more host computer systems. Such data storage and retrieval systems receive requests to write information to one or more data storage devices, and requests to retrieve information from those one or more data storage devices. Upon receipt of a write request, the system stores information received from a host computer in one or more data storage devices. Upon receipt of a read request, the system recalls information from the one or more data storage devices. Thus, the system is continuously moving information to and from one or more data storage devices, and optionally to and from a data cache.

Data storage and retrieval systems are often designed to autonomically recover from hardware errors. Error thresholds are set, and when a particular piece of hardware exceeds the applicable error threshold, a permanent hardware error is detected. In response to such a permanent error, the errant resource is disabled. Manual intervention is then required to reset the disabled resource.

Using prior art methods, the default error thresholds cannot be tuned during tests, or in actual use. During a test program, the pre-programmed method which automatically disables an errant device may prevent the tester from simulating a different error test case. In actual use, these prior art methods are troublesome because the default error thresholds may not meet the needs of a customer.

What is needed, for the reasons set forth herein, is a method to adjust one or more device error thresholds. Applicants' invention comprises a method to adjust one or more error thresholds in a data storage and retrieval system.

SUMMARY OF THE INVENTION

Applicants' invention comprises a method to adjust error thresholds in a data storage and retrieval system. The method supplies a data storage and retrieval system comprising memory and microcode, wherein that microcode comprises one or more default error thresholds. The method determines if the memory comprises one or more operational error thresholds. If the method determines that the memory comprises a one or more operational error thresholds, then the method operates the data storage and retrieval system using those one or more operational error thresholds. Alternatively, if the method determines that the memory does not comprise one or more operational error thresholds, then the method sets the one or more default error thresholds as one or more operational error thresholds. If Applicants' data storage and retrieval system receives one or more revised error thresholds, then the method adjusts the operational error thresholds to comprise those one or more revised error thresholds, and writes those one or more adjusted operational error thresholds to the memory.

BRIEF DESCRIPTION OF THE DRAWINGS

The invention will be better understood from a reading of the following detailed description taken in conjunction with the drawings in which like reference designators are used to designate like elements, and in which:

FIG. 4 is a flow chart summarizing the steps of Applicants' method.

DETAILED DESCRIPTION OF THE PREFERRED EMBODIMENTS

This invention is described in preferred embodiments in the following description with reference to the Figures, in which like numbers represent the same or similar elements. The invention will be described as embodied in a data storage and retrieval system which comprises two clusters, a plurality of host adapter ports, a plurality of device adapter ports, and a data cache. This description of Applicants' invention should not be interpreted to limit the invention to adjusting error thresholds in a data storage and retrieval system comprising two clusters, and/or two processors, as Applicants' method can be used generally to adjust error thresholds in a data storage and retrieval system.

Figure 1:
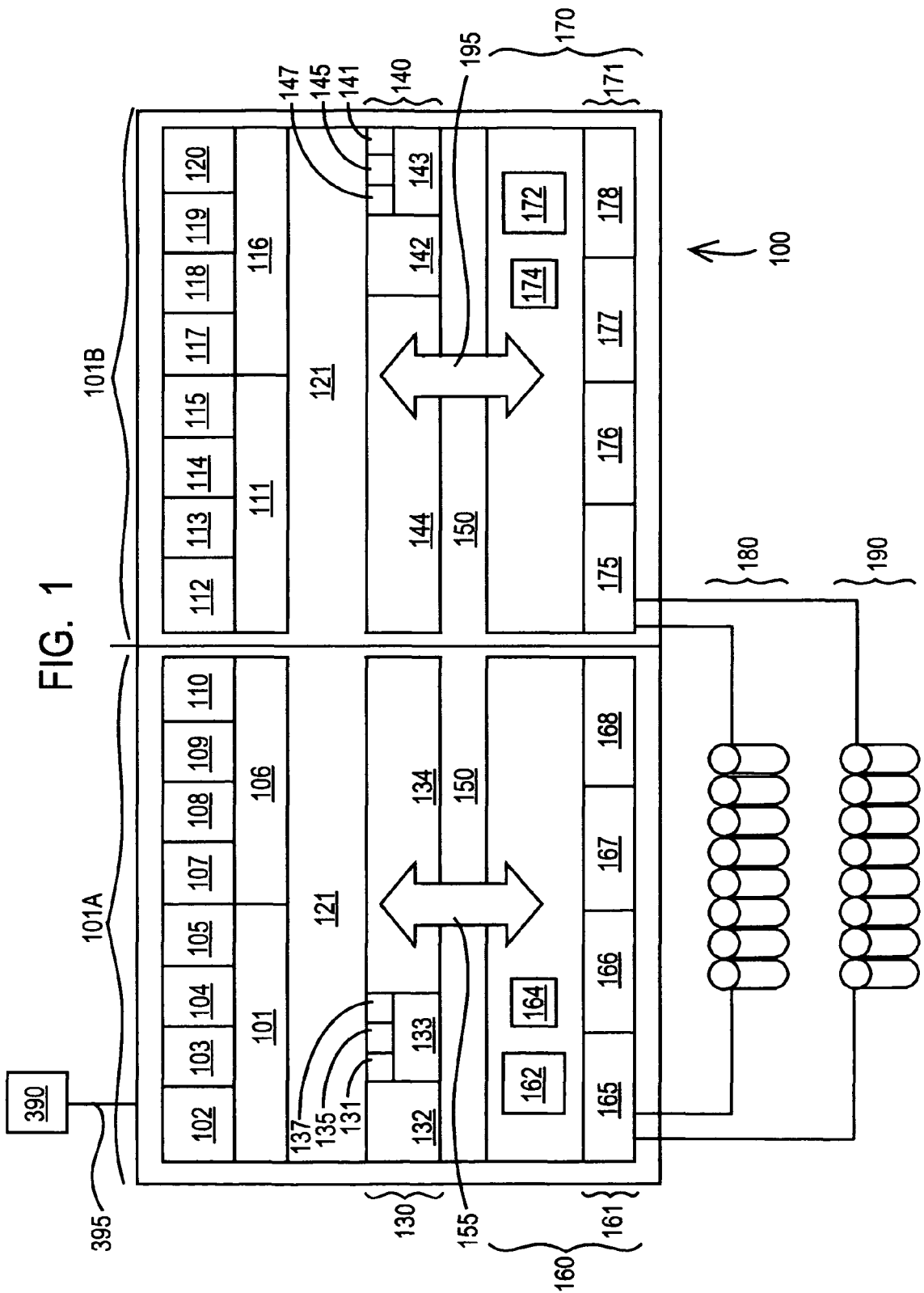
FIG. 1 is a block diagram showing one embodiment of Applicants' data storage and retrieval system.

Referring now to FIG. 1, data storage and retrieval system 100 is capable of communication with host computer 390 via communication link 395. The illustrated embodiment of FIG. 1 shows a single host computer. In other embodiments, Applicants' data storage and retrieval system is capable of communicating with a plurality of host computers.

Host computer 390 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 further comprises a storage management program. The storage management program in the host computer 390 may include the functionality of storage management type programs known in the art that manage the transfer of data to a data storage and retrieval system, such as the IBM DFSMS implemented in the IBM MVS operating system.

In certain embodiments, Applicants' data storage and retrieval system 100 comprises a first plurality of host adapter ports 101 which comprises adapters 102-105 and 107-110; and a second plurality of host adapter ports 111 which comprises adapters 112-115 and 117-120. In other embodiments, Applicants' data storage and retrieval system comprises fewer than 16 host adapter ports. In still other embodiments, Applicants' data storage and retrieval system comprises more than 16 host adapter ports.

Regardless of the number of host adapter ports disposed in any embodiments of Applicants' system, each of those host adapter ports comprises a shared resource that has equal access to both central processing/cache elements 130 and 140. Each host adapter port may comprise one or more Fibre Channel ports, one or more FICON ports, one or more ESCON ports, or one or more SCSI ports, or one or more iSCSI ports. Each host adapter port is connected to both clusters through interconnect bus 121 such that each cluster can handle I/O from any host adapter port. Internal buses in each subsystem are connected via a Remote I/O bridge 155/195 between the processor portions 130/140 and I/O portions 160/170, respectively.

Processor portion 130 comprises processor 132 and cache 134. In certain embodiments, processor portion 130 further comprises memory 133. In certain embodiments, memory 133 comprises random access memory. In certain embodiments, memory 133 comprises non-volatile memory.

In the illustrated embodiment of FIG. 1, memory 133 comprises system device driver 131 and system microcode 135, wherein system microcode 135 comprises one or more default error thresholds. In the illustrated embodiment of FIG. 1, memory 133 further optionally comprises one or more operational error thresholds 137.

Processor portion 140 comprises processor 142 and cache 144. In certain embodiments, processor portion 140 further comprises memory 143. In certain embodiments, memory 143 comprises random access memory. In certain embodiments, memory 143 comprises non-volatile memory.

In the illustrated embodiment of FIG. 1, memory 143 comprises system device driver 141 and system microcode 145, wherein system microcode 145 comprises one or more default error thresholds. In the illustrated embodiment of FIG. 1, memory 143 further optionally comprises one or more operational error thresholds 147.

I/O portion 160 comprises a plurality of device adapter ports 161 which in the illustrated embodiment of FIG. 1 comprises device adapter ports 165, 166, 167, and 168. I/O portion 160 further comprise nonvolatile storage ("NVS") 162 and battery backup 164 for NVS 162.

I/O portion 170 comprises a plurality of device adapter ports 171 which in the illustrated embodiment of FIG. 1 comprises device adapter ports 175, 176, 177, and 178. I/O portion 170 further comprise nonvolatile storage ("NVS") 172 and battery backup 174 for NVS 172.

Figure 2:
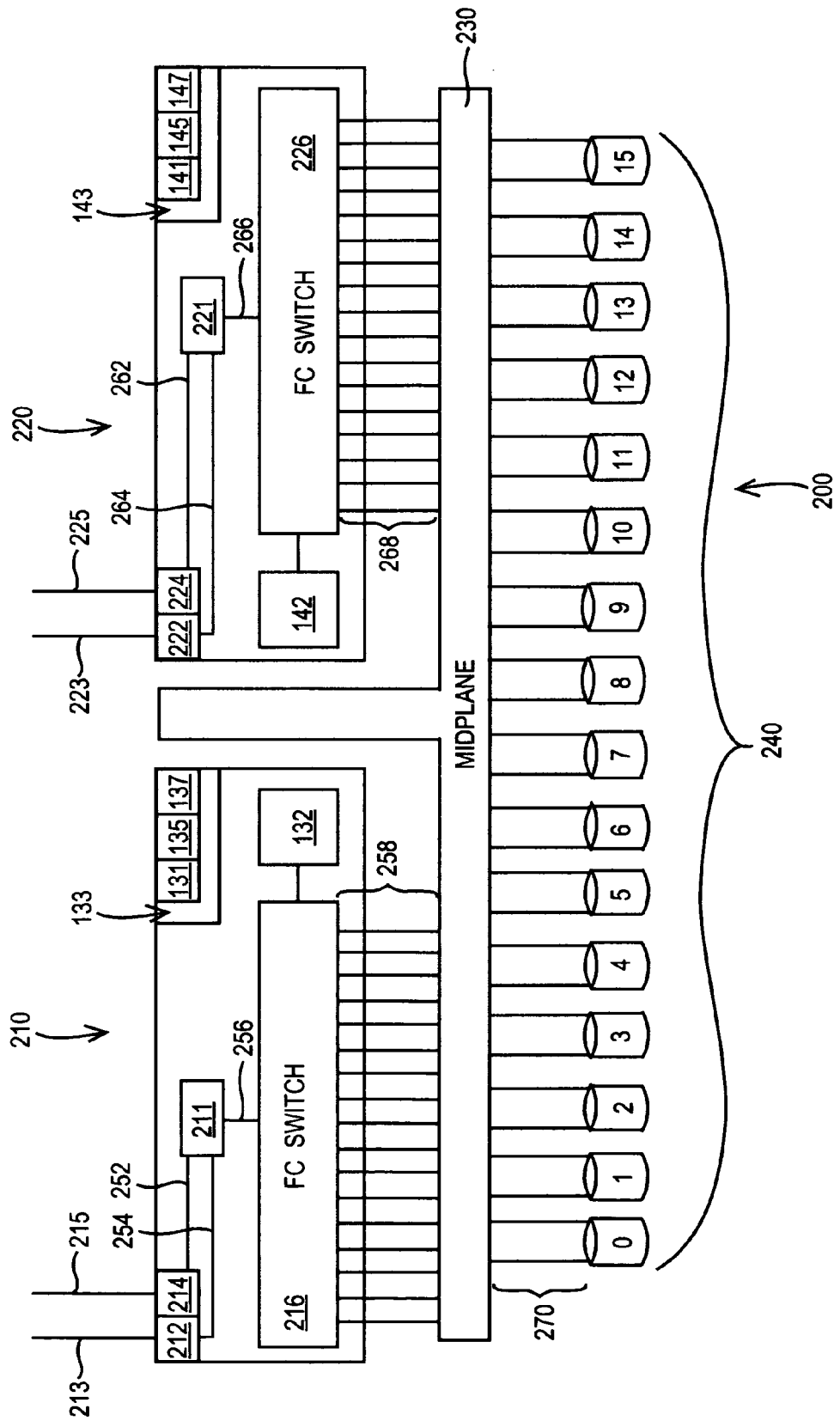
FIG. 2 is a block diagram showing a second embodiment of Applicants' data storage and retrieval system which comprises two storage controllers and a plurality of data storage devices.

In certain embodiments of Applicants' system, one or more host adapter ports 101, processor portion 130, and one or more device adapter ports 161, are disposed in a single controller, such as controller 210 (FIG. 2) disposed in Applicants' data storage and retrieval system. Similarly, in certain embodiments, one or more host adapter ports 111, processor portion 140, and one or more device adapter ports 171, are disposed on second controller, such as controller 220, disposed in Applicants' data storage and retrieval system. In these embodiments, Applicants' system 100 comprises one or two controllers such as controller 210 (FIG. 2) and/or controller 220 (FIG. 2).

In the illustrated embodiment of FIG. 1, sixteen data storage devices are organized into two arrays, namely array 180 and array 190. The illustrated embodiment of FIG. 1 shows two storage device arrays. Each storage array appears to a host computer as one or more logical devices.

In certain embodiments, one or more of the data storage devices comprise a plurality of hard disk drive units. In certain embodiments, arrays 180 and 190 utilize a RAID protocol. In certain embodiments, arrays 180 and 190 comprise what is sometimes called a JBOD array, i.e. "Just a Bunch Of Disks" where the array is not configured according to RAID. In still other embodiments, arrays 180 and 190 comprise what is sometimes called a SBOD array, i.e. "Switched Bunch Of Disks," where those arrays are not configured according to RAID.

The illustrated embodiment of FIG. 1 shows two storage device arrays. In other embodiments, Applicants' system comprises a single storage device array. In yet other embodiments, Applicants' system comprises more than two storage device arrays.

Referring now to FIG. 2, in certain embodiments Applicants' storage system comprise two storage controllers 210 and 220 in combination with a plurality of data storage devices. System 200 further comprises a midplane interconnecting the two storage controllers to one or more data storage devices. Midplane 230 interconnects a plurality of data storage devices 240 with storage controllers 210 and 220. Each of the plurality of data storage devices 240 comprises two Fibre Channel ports. In the illustrated embodiment of FIG. 2, each of two Fibre Channel ports disposed on each of the plurality of data storage devices 240 are used to interconnect each of the plurality of data storage devices 240 to storage controllers 210 and 220 via midplane 230. As those skilled in the art will appreciate, use of both Fibre Channel ports on each of the plurality of data storage devices 240 provides two I/O paths to read and/or write information from and/or to each of those data storage devices.

In the illustrated embodiment of FIG. 2, storage controller 210 comprises host adapter port 212, host adapter port 214, Fibre Channel switch 216, processor 132, and memory 133. Further in the illustrated embodiment of FIG. 2, memory 133 comprises system device driver 131. device microcode 135 which comprises, inter alia, default error thresholds, and operational error thresholds 137.

Storage controller 210 further comprises storage logic 211 interconnected with host adapter port 212, host adapter port 214, and Fibre Channel switch 216, by communication links 252, 254, and 256, respectively. Storage logic 211 receives host commands, and optionally host data payloads, and directs those host commands and those optional host data payloads to Fibre Channel switch 216 with commands to provide those host commands to processor 132, and to provide the host data payloads to one or more designated data storage devices, such as one or more of data storage devices 240.

In certain embodiments, processor 132 comprises an SES processor. In certain embodiments, that SES processor comprises a Fibre Channel initiator. In other embodiments, Applicants' storage controller 210 comprises more than two host adapter ports, and/or more that two device adapter ports.

Communication link 213 interconnects host adapter port 212 to one or more host computers. Communication link 215 interconnects host adapter port 214 to one or more host computers.

In the illustrated embodiment of FIG. 2, storage controller 220 comprises host adapter port 222, host adapter port 224, Fibre Channel switch 226, processor 142, and memory 143. Further in the illustrated embodiment of FIG. 2, memory 143 comprises system device driver 141, device microcode 145 which comprises, inter alia, default error thresholds, and operational error thresholds 147.

Storage controller 220 further comprises storage logic 221 interconnected with host adapter port 222, host adapter port 224, and Fibre Channel switch 226 by communication links 262, 264, and 266, respectively. Storage logic 221 receives host commands, and optionally host data payloads, and directs those host commands to processor 142, and directs the optional host data payloads to Fibre Channel switch 226 with commands to provide those host commands and optionally host data payloads to one or more designated data storage devices, such as one or more of data storage devices 240.

In certain embodiments, processor 142 comprises an SES processor. In certain embodiments, that SES processor comprises a Fibre Channel initiator. In other embodiments, Applicants' storage controller 220 comprises more than two host adapter ports, and/or more that two device adapter ports.

Fibre Channel switch 216 is interconnected to midplane 230 by plurality of communication links 258. Fibre Channel switch 226 is interconnected to midplane 230 by plurality of communication links 268. Midplane 230 is interconnected to plurality of data storage devices 240 by plurality of communication links 270.

Figure 3:
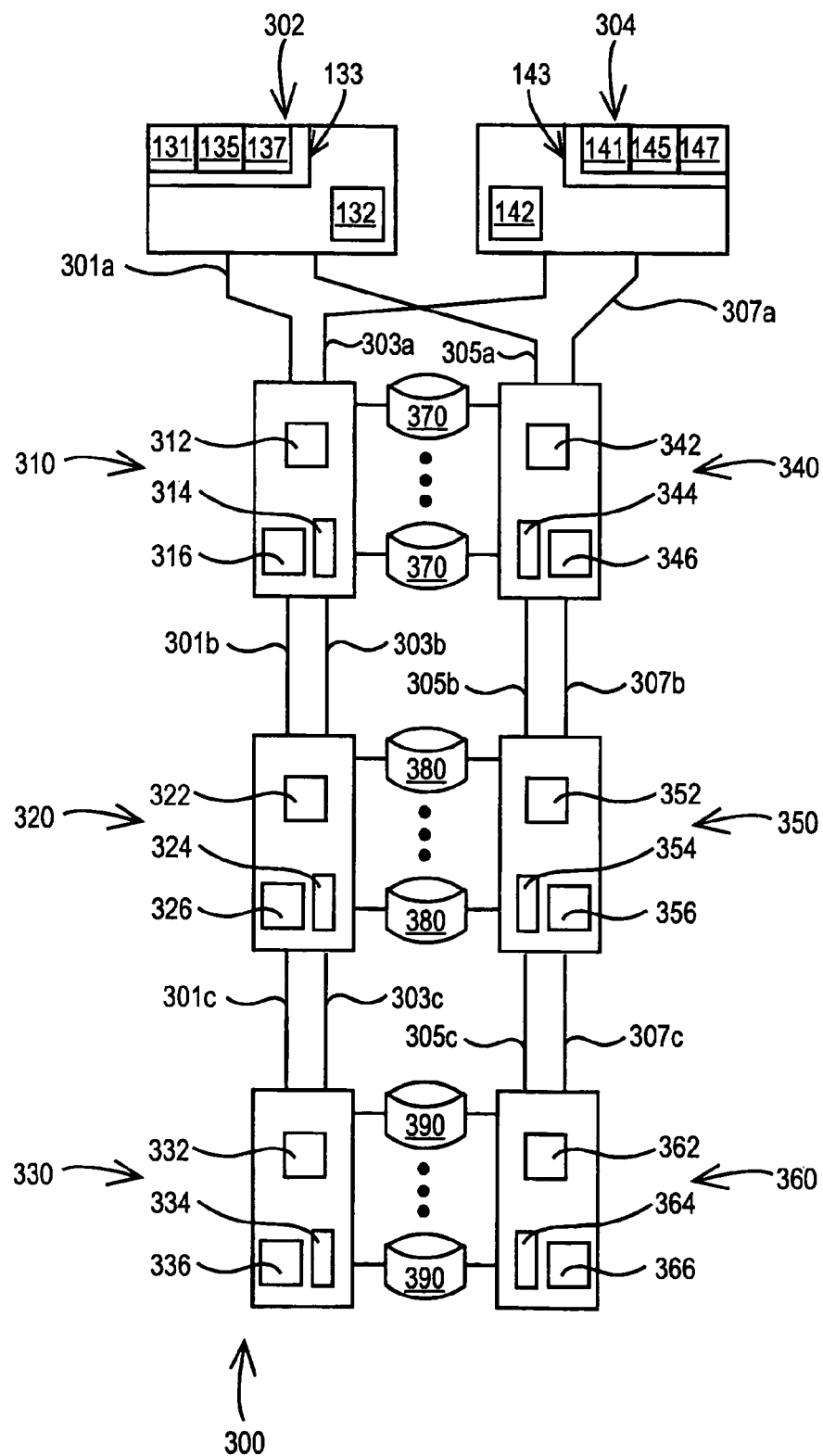
FIG. 3 is a block diagram showing a third embodiment of Applicants' data storage and retrieval system which comprises two storage controllers and a first, a second, and a third plurality of data storage devices.

Referring now to FIG. 3, Applicants' data storage and retrieval system 300 comprises dual Fibre Channel arbitrated loops ("FC-AL") comprising a plurality of Fibre Channel switches where storage controllers 302 and 304 are each connected to two FC-AL loops. Each loop contains a plurality of switch domain control cards, such as switch domain control cards 310, 320, 330, 340, 350, and 360.

Each switch domain control card comprises a switch and a processor. In certain embodiments, the switch comprises a Fibre Channel switch. In certain embodiments, the processor comprises an SES processor. In the illustrated embodiment of FIG. 3, switch domain controllers 310, 320, 330, 340, 350, and 360, comprise processors 312, 322, 332, 342, 352, and 362, respectively. In the illustrated embodiment of FIG. 3, switch domain controllers 310, 320, 330, 340, 350, and 360, include switches 314, 324, 334, 344, 354, and 364, respectively. In the illustrated embodiment of FIG. 3, switch domain controllers 310, 320, 330, 340, 350, and 360, include microcode 316, 326, 336, 346, 356, and 366, respectively.

In the illustrated embodiment of FIG. 3, each of the plurality of data storage devices 370, and each of the plurality of data storage devices 380, and each of the plurality of data storage devices 390, can be accessed through two different Fibre Channel switches disposed in two different switch domain controllers. As those skilled in the art will appreciate, use of both Fibre Channel ports on each of the plurality of data storage devices 370, 380, and 390, provides two I/O paths to read and/or write information from and/or to each of the data storage devices.

Applicants' invention comprises a method to adjust the error thresholds used in Applicants' data storage and retrieval system, such as for example and without limitation system 100 (FIG. 1), system 200 (FIG. 2), and/or system 300 (FIG. 3). Referring now to FIG. 4, in step 410 Applicants' method provides a data storage and retrieval system comprising memory, such as memory 133 (FIGS. 1, 2, 3) and/or memory 143 (FIG. 1, 2, 3). Step 410 further comprises providing a storage system comprising a system device driver, such as system device driver 131 (FIGS. 1, 2, 3) and/or system device driver 141 (FIGS. 1, 2, 3).

Step 410 further comprises providing a storage system comprising system microcode, such as microcode 135 (FIGS. 1, 2, 3) and/or microcode 145 (FIGS. 1, 2, 3). In certain embodiments, that system microcode comprises one or more default error thresholds. Such one or more error thresholds comprise, for example, the maximum number of logic errors and/or power system errors permissible during a designated time interval. Such error thresholds further comprise, for example, error thresholds for designated time intervals comprising a maximum number of communication link errors, i.e. bus errors, for each communication link, such as remote I/O bridge 155 (FIG. 1), remote I/O bridge 165 (FIG. 2), communication link 213 (FIG. 2), communication link 215 (FIG. 2), communication link 223 (FIG. 2), communication link 225 (FIG. 2), communication link 252 (FIG. 2), communication link 254 (FIG. 2), communication link 256 (FIG. 2), communication link 262 (FIG. 2), communication link 264 (FIG. 2), communication link 266 (FIG. 2), communication link 301*a* (FIG. 3), communication link 301*b* (FIG. 3), communication link 301*c* (FIG. 3), communication link 303*a* (FIG. 3), communication link 303*b* (FIG. 3), communication link 303*c* (FIG. 3), communication link 305*a* (FIG. 3), communication link 305*b* (FIG. 3), communication link 305*c* (FIG. 3), communication link 307*a* (FIG. 3), communication link 307*b* (FIG. 3), communication link 307*c* (FIG. 3), disposed in the system, such as system 100 (FIG. 1), system 200 (FIG. 2), and/or system 300 (FIG. 3).

Step 410 further comprises providing system memory optionally comprising one or more operational error thresholds, such as for example operational error thresholds 137 (FIGS. 1, 2, 3) and/or operational error thresholds 147 (FIGS. 1, 2, 3). In certain embodiments, the operational error thresholds 137 and/or 147 are written to a database disposed in memory 133 and/or 143, respectively. In other embodiments, the operational error thresholds 137 and/or 147 are written to a look-up table disposed in memory 133 and/or 143, respectively. In yet other embodiments, the operational error thresholds 137 and/or 147 are written to a flat file disposed in memory 133 and/or 143, respectively.

In step 420, Applicants' method loads the system device driver, such as system device driver 131 (FIGS. 1, 2, 3) and/or system device driver 141 (FIGS. 1, 2, 3). In certain embodiments, step 420 is performed by a processor, such as processor 132 (FIGS. 1, 2, 3) and/or processor 142 (FIGS. 1, 2, 3), disposed in the data storage and retrieval system of step 410.

In step 430, Applicants' method determines if system memory, such as memory 133 (FIGS. 1, 2, 3) and/or memory 143 (FIGS. 1, 2, 3), comprises operational error thresholds, such as operational error thresholds 137 (FIGS. 1, 2, 3) and/or operation error thresholds 147 (FIGS. 1, 2, 3). In certain embodiments, step 430 is performed by a processor, such as processor 132 (FIGS. 1, 2, 3) and/or processor 142 (FIGS. 1, 2, 3), disposed in the data storage and retrieval system of step 410. In other embodiments, step 430 is performed by a host computer, such as host computer 390 (FIG. 1), interconnected with Applicants' data storage and retrieval system.

If Applicants' method determines in step 430 that system memory does comprise operational error thresholds, then the method transitions from step 430 to step 460. Alternatively, if Applicants' method determines in step 430 that system memory does not comprise operational error thresholds, then the method transitions from step 430 to step 440 wherein the method reads one or more default error thresholds from system microcode, such as microcode 135 (FIGS. 1, 2, 3) and/or microcode 145 (FIGS. 1, 2, 3), and sets those one or more default error thresholds as one or more operational error thresholds 137 and/or operational error thresholds 147. In certain embodiments, step 440 is performed by a processor, such as processor 132 (FIGS. 1, 2, 3) and/or processor 142 (FIGS. 1, 2, 3), disposed in the data storage and retrieval system of step 410. In other embodiments, step 440 is performed by a host computer, such as host computer 390 (FIG. 1), interconnected with Applicants' data storage and retrieval system.

Applicants' method transitions from step 440 to step 450 wherein Applicants' method writes the operational error thresholds of step 440 to system memory, such as memory 133 (FIGS. 1, 2, 3) and/or memory 143 (FIGS. 1, 2, 3). In certain embodiments, step 450 is performed by a processor, such as processor 132 (FIGS. 1, 2, 3) and/or processor 142 (FIGS. 1, 2, 3), disposed in the data storage and retrieval system of step 410. In other embodiments, step 450 is performed by a host computer, such as host computer 390 (FIG. 1), interconnected with Applicants' data storage and retrieval system.

Applicants' method transitions from step 450 to step 460 wherein the method operates the data storage and retrieval system of step 410 using the one or more operational error thresholds written to memory. In certain embodiments, step 460 is performed by a processor, such as processor 132 (FIGS. 1, 2, 3) and/or processor 142 (FIGS. 1, 2, 3), disposed in the data storage and retrieval system of step 410. In other embodiments, step 460 is performed by a host computer, such as host computer 390 (FIG. 1), interconnected with Applicants' data storage and retrieval system.

In step 470, Applicants' method determines if one or more revised error thresholds have been received. In certain embodiments, step 470 is performed by a processor, such as processor 132 (FIGS. 1, 2, 3) and/or processor 142 (FIGS. 1, 2, 3), disposed in the data storage and retrieval system of step 410. In other embodiments, step 470 is performed by a host computer, such as host computer 390 (FIG. 1), interconnected with Applicants' data storage and retrieval system.

In certain embodiments, step 470 further comprises receiving one or more revised error thresholds, wherein those one or more revised error thresholds are provided by the owner and/or operator of the data storage and retrieval system. In certain embodiments, step 470 further comprises receiving one or more revised error thresholds, wherein those one or more revised error thresholds are provided by a host computer, such as host computer 390 (FIG. 1), interconnected with the data storage and retrieval system.

In certain embodiments, the data storage and retrieval system of step 410 is owned and/or operated by a data storage services provider. That data storage services provider provides data storage services to one or more data storage services customers. In certain embodiments, a host computer, such as host computer 390 (FIG. 1), is owned and/or operated by such a data storage services customer. In certain embodiments, step 470 further comprises receiving one or more revised error thresholds from a data storage services customer.

If Applicants' method does not receive revised error thresholds, then the method transitions from step 470 to step 460 and continues as described herein. Alternatively, if Applicants' method does receive revised error thresholds, then the method transitions from step 470 to step 480 wherein the method adjusts the one or more operational error thresholds to comprise the one or more revised error thresholds received in step 470. Applicants' method transitions from step 480 to step 450 wherein the method writes the one or more adjusted operational error thresholds to memory, and then continues as described herein.

In certain embodiments, step 480 is performed by a processor, such as processor 132 (FIGS. 1, 2, 3) and/or processor 142 (FIGS. 1, 2, 3), disposed in the data storage and retrieval system of step 410. In other embodiments, step 480 is performed by a host computer, such as host computer 390 (FIG. 1), interconnected with Applicants' data storage and retrieval system.

In certain embodiments, individual steps recited in FIG. 4, may be combined, eliminated, or reordered.

In certain embodiments, Applicants' invention includes instructions residing memory 133 (FIGS. 1, 2, 3) and/or memory 143 (FIGS. 1, 2, 3), where those instructions are executed by a processor, such as processor 132 (FIGS. 1, 2, 3) and/or 142 (FIGS. 1, 2, 3), respectively, to perform one or more of steps 420, 430, 440, 450, 460, 470, and/or 480, recited in FIG. 4.

In other embodiments, Applicants' invention includes instructions residing in any other computer program product, where those instructions are executed by a computer external to, or internal to, system 100, to perform steps one or more of steps 420, 430, 440, 450, 460, 470, and/or 480, recited in FIG. 4. In either case, the instructions may be encoded in an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to adjust error thresholds in a data storage and retrieval system, comprising the steps of:
    supplying a data storage and retrieval system comprising two storage controllers, each storage controller comprising a Fibre Channel switch, Fibre Channel initiator, storage logic, and memory, wherein said memory comprises a system device driver and microcode, wherein said microcode comprises one or more default error thresholds, and wherein said storage logic receives host commands, and host data payloads, and directs said host commands and host data payloads to a Fibre Channel switch with commands to provide said host commands to a Fibre Channel initiator, and to provide said host data payloads to one or more designated data storage devices, each data storage device comprises two Fibre Channel ports;
    determining if said memory comprises one or more operational error thresholds;
    operative if said memory comprises one or more operational error thresholds, operating said data storage and retrieval system using said one or more operational error thresholds;
    operative if said memory does not comprise one or more operational error thresholds, reading one or more default error thresholds from said microcode and setting those one or more default error thresholds as one or more operational error thresholds;
    wherein said default error thresholds comprise a maximum number of power system errors permissible during a designated time interval.

2. The method of claim 1, further comprising the steps of setting said one or more default error thresholds as said one or more operational error thresholds if said memory does not comprise one or more operational error thresholds, wherein said default error thresholds comprise a maximum number of logic errors permissible during a designated time interval.

3. The method of claim 2, further comprising the step of writing said one or more operational error thresholds to said memory, wherein said operational error thresholds further comprise a maximum number of communication link errors during said designated time interval.

4. The method of claim 3, further comprising the steps of:
    receiving one or more revised error thresholds;
    adjusting said operational error thresholds to comprise said one or more revised error thresholds;
    writing said adjusted operational error thresholds to said memory.

5. The method of claim 4, wherein said receiving step comprises receiving one or more revised error thresholds from the operator of said data storage and retrieval system.

6. The method of claim 4, wherein said receiving step comprises receiving one or more revised error thresholds from a host computer interconnected with said data storage and retrieval system.

7. An article of manufacture comprising an information storage medium having computer readable program code disposed therein to adjust error thresholds in a data storage and retrieval system comprising two storage controllers, each storage controller comprising a Fibre Channel switch, a Fibre Channel initiator, storage logic, and memory, wherein said memory comprises a system device driver and microcode, wherein said microcode comprises one or more default error thresholds, and wherein said storage logic receives host commands, and host data payloads, and directs said host commands and host data payloads to a Fibre Channel switch with commands to provide said host commands to a Fibre Channel initiator, and to provide said host data payloads to one or more designated data storage devices, each data storage device comprises two Fibre Channel ports, the computer readable program code comprising a series of computer readable program steps to effect:

determining if said memory comprises one or more operational error thresholds;

operative if said memory comprises one or more operational error thresholds, operating said data storage and retrieval system using said one or more operational error thresholds;

operative if said memory does not comprise one or more operational error thresholds, reading one or more default error thresholds from said microcode and setting those one or more default error thresholds as one or more operational error thresholds;

wherein said default error thresholds comprise a maximum number of power system errors permissible during a designated time interval.

8. The article of manufacture of claim 7, said computer readable program code further comprising a series of computer readable program steps to effect setting said one or more default error thresholds as said one or more operational error thresholds if said memory does not comprise one or more operational error thresholds, wherein said default error thresholds comprise a maximum number of logic errors permissible during a designated time interval.

9. The article of manufacture of claim 8, said computer readable program code further comprising a series of computer readable program steps to effect writing said one or more operational error thresholds to said memory, wherein said operational error thresholds further comprise a maximum number of communication link errors during said designated time interval.

10. The article of manufacture of claim 9, said computer readable program code further comprising a series of computer readable program steps to effect:

receiving one or more revised error thresholds;

adjusting said operational error thresholds to comprise said one or more revised error thresholds;

writing said adjusted operational error thresholds to said memory.

11. The article of manufacture of claim 10, said computer readable program code further comprising a series of computer readable program steps to effect receiving one or more revised error thresholds from the operator of said data storage and retrieval system.

12. The article of manufacture of claim 10, said computer readable program code further comprising a series of computer readable program steps to effect receiving one or more revised error thresholds from a host computer interconnected with said data storage and retrieval system.

13. A computer program product encoded in an information storage medium and usable with a programmable computer processor to adjust error thresholds in a data storage and retrieval system comprising two storage controllers, each storage controller comprising a Fibre Channel switch, a Fibre Channel initiator, storage logic, and memory, wherein said memory comprises a system device driver and microcode, wherein said microcode comprises one or more default error thresholds, and wherein said storage logic receives host commands, and host data payloads, and directs said host commands and host data payloads to a Fibre Channel switch with commands to provide said host commands to a Fibre Channel initiator, and to provide said host data payloads to one or more designated data storage devices, each data storage device comprises two Fibre Channel ports, comprising:

computer readable program code which causes said programmable computer processor to determine if said memory comprises one or more operational error thresholds;

computer readable program code which, if said memory comprises one or more operational error thresholds, causes said programmable computer processor to operate said data storage and retrieval system using said one or more operational error thresholds;

computer readable program code which, if said memory does not comprise one or more operational error thresholds, causes said programmable computer processor to read one or more default error thresholds from said microcode and set those one or more default error thresholds as one or more operational error thresholds;

wherein said default error thresholds comprise a maximum number of power system errors permissible during a designated time interval.

14. The computer program product of claim 13, further comprising computer readable program code which, if said memory does not comprise one or more operational error thresholds, causes said programmable computer processor to set said one or more default error thresholds as said one or more operational error thresholds, wherein said default error thresholds comprise a maximum number of logic errors permissible during a designated time interval.

15. The computer program product of claim 14, further comprising computer readable program code which causes said programmable computer processor to write said one or more operational error thresholds to said memory, wherein said operational error thresholds further comprise a maximum number of communication link errors permissible during said designated time interval.

16. The computer program product of claim 15, further comprising:

computer readable program code which causes said programmable computer processor to receive one or more revised error thresholds;

computer readable program code which causes said programmable computer processor to adjust said one or more operational error thresholds to comprise said one or more revised error thresholds;

computer readable program code which causes said programmable computer processor to write said adjusted operational error thresholds to said memory.

17. The computer program product of claim 16, further comprising computer readable program code which causes said programmable computer processor to receive one or more revised error thresholds from the operator of said data storage and retrieval system.

18. The computer program product of claim 16, further comprising computer readable program code which causes said programmable computer processor to receive one or more revised error thresholds from a host computer interconnected with said data storage and retrieval system.

\* \* \* \* \*